United States Patent [19]

Bohannon

[11] Patent Number: 4,658,421
[45] Date of Patent: Apr. 14, 1987

[54] TELEPHONE SET STAND

[75] Inventor: Harold L. Bohannon, Shreveport, La.

[73] Assignees: AT&T Company; AT&T Technologies, Inc., both of Berkeley Heights, N.J.

[21] Appl. No.: 715,810

[22] Filed: Mar. 25, 1985

[51] Int. Cl.[4] .......................... H04R 1/02; H04R 1/06; H04R 1/26
[52] U.S. Cl. ..................................... 379/422; 379/424; 379/425; 379/427; 379/436
[58] Field of Search .................... 179/147, 158 R, 159, 179/178, 179, 100 R, 100 C, 100 D, 101, 102, 103, 90 K

[56] References Cited

U.S. PATENT DOCUMENTS

| | | | |
|---|---|---|---|
| 2,566,840 | 9/1951 | Krumreich | 179/158 R |
| 2,972,021 | 2/1961 | Bryant et al. | 179/100 D |
| 3,406,263 | 10/1968 | Klenk et al. | 179/100 R |
| 3,627,930 | 12/1971 | Tolman | 179/100 R |
| 4,040,120 | 8/1977 | Geadah | 179/100 R |
| 4,124,785 | 11/1978 | Seretny et al. | 179/103 |
| 4,365,118 | 12/1982 | Lindman et al. | 179/159 |
| 4,394,545 | 7/1983 | Doyle et al. | 179/179 |

Primary Examiner—Gene Z. Rubinson
Assistant Examiner—Danita R. Byrd
Attorney, Agent, or Firm—R. F. Kip, Jr.; Harry L. Newman

[57] ABSTRACT

A stand for a telephone set comprises an open-bottomed housing providing at its top a handset cradle to the rear of a housing upper wall slanting up towards the cradle and having a large aperture in it. A keypad has keys projecting outward within the aperture and, also, an upwardly slanting cover framed by the aperture. The keypad is secured to the housing by screws passing through support tabs at the side margins of the aperture and into the casing. A faceplate covers the heads of those screws. A printed wiring board with printed wire conductors and bulk telephone set components on, respectively, its upper and lower sides is secured beneath and to the keypad to be spaced from, and have the same upward slant as, the keypad. Mounted on the rear of the board is a line switch with a spring biased pivotable actuating lever. The outer end of that lever is coupled by a slidable bearing lost motion contact with the central part of an "H" shaped rocker member disposed above the lever and pivotable about an axis frontward of the lever's pivot axis. The rocker member has rearwardly extending arms bearing against the bottoms of plungers slidable in guide holes in the housing to project above the bottom of the cradle and be driven down into the housing when, respectively, a handset is not in and is in the cradle. The yieldable spring bias in the switch lever is transmitted via the rocker member to the plungers. The housing's bottom is closed by a base plate having no components mounted in or on it.

21 Claims, 13 Drawing Figures

TELEPHONE SET STAND

FIELD OF THE INVENTION

This invention relates to stands for telephone sets comprising the stand itself and a telephone handset attachable by a cord to the stand. More particularly, this invention relates to telephone stands of such kind which include novel structure so as to provide one or more advantages such as reducing the cost of the stand.

BACKGROUND OF THE INVENTION

A telephone stand of the sort described commonly has an enclosure structure comprising a deeply hollow, generally thin-walled molded plastic open-bottomed upper housing and a base plate providing a bottom closure for such housing. The housing mounts the keypad or other dial device for the set and, to the rear of such keypad, has a cradle and associated elements whereby, when the handset of the set is first removed from and then returned to the cradle, a line switch in the stand is actuated to be, respectively, in OFF-HOOK and on ON-HOOK condition. Also included in the stand are various other components for effecting operation of the set.

In the past, it was often the case that a majority of such components were mounted on the stand's base plate and connected in circuit through a complex of irregularly aligned insulated wire leads extending in various directions from locations on or adjacent to the base plate to other near or remote locations. Because, however, of the cost of such leads, the numerous assembling steps required to effect their wiring and the increased risk (due to the complexity and irregular aligning of such wiring) in making an error therein, the cost of manufacture of such telephone stands has been substantially more expensive than is desirable.

An alternative proposed in the prior art to mounting components of the set on the base plate is to mount such components elsewhere in the stand and to connect them in circuit by the use of a printed wiring board disposed within the stand and on which the wiring for the components has been pre-established, the printed conductors on the board replacing the previously used insulated wire leads, and the number of assembling steps required being reduced.

Thus, for example, U.S. Pat. No. 4,394,545 issued July 19, 1983 in the name of Frances S. Doyle et al., and assigned to the assignee thereof, discloses a repertory dialer adjunct for a telephone set in which various of the components for the set are mounted on the underside of a rigid printed wiring board disposed against the underside of a keyboard assembly on the inside of the upper face of the upper housing for the repertory dialer. The pushbuttons of the assembly protrude through holes formed in such face. The board and assembly are secured in relation to such face by deflectable latch elements extending downwardly from the face and having catch surfaces adapted, after deflection of such elements (by passage of such board past such catch surfaces) to spring back and underlie the board so as to latch it in place. That expedient of coupling the board and assembly to the housing only by deflectable latching elements has, however, the disadvantage that such coupling may not be rugged enough to withstand failure when the repertory dialer is subjected to the stringent reliability tests which telephone sets are required to meet as, for example, "drop" tests.

As another example, U.S. Pat. No. 3,627,930 issued December, 1971 in the name of W. R. Tolman, and assigned to the assignee hereof, discloses a dial-in telephone handset in which the central region of a flexible elongated printed wiring board or "flex" is sandwiched between the back cover and the side cover of a dial assembly for the handset. The two end regions of the "flex" are extended out on opposite sides of such covers, and these two end regions carry, respectively, a transmitter housing connector cup and a receiver housing connector cup. The combination of such dial assembly, its covers, the "flex" and such two cups is adapted to be mounted in the top plastic housing of the handset so that the keys of the dial assembly project through an aperture in such housing, and so that those two cups will connect the printed wiring on the "flex" with, respectively, a transmitter and receiver contained in the housing.

The mounting of such combination in the housing. is effected by fastening screws passing through brackets on the side cover of the assembly and then into the housing, the screws being oriented to have their heads on the inner side of the brackets and their shanks extending from such heads into the plastic housing material. Such orientation of the screws creates the difficulty, however, that, since the housing is, for the most part, thin-walled, if it were attempted without more to secure the screws in the housing's plastic material, that material would not be thick enough for the threaded shanks of the screws to get a good "bite" on such material.

To overcome such difficulty, the Tolman handset utilizes the expedient of supplementing the thin-walled shell of its top housing with special plastic support posts integral with and projecting inward from such shell to receive the shanks of the mentioned screws in threaded holes in the posts. The posts are long enough to accommodate much of the lengths of the screw shanks and, thus, provide a rugged coupling between the housing and the mentioned combination. The use of that expedient is, however, wasteful of plastic material, requires a more complex mold for the housing then would otherwise be required, and is otherwise costly.

SUMMARY OF THE INVENTION

In contrast to those expedients of the prior art, a telephone set stand according to the invention in one of its aspects comprises: a top housing with an upper thin wall having formed therein a large indented portion forming a shallow depression in the wall, a large aperture centered in such portion, and screw holes passing through such portion on opposite sides of said aperture, a keypad comprising a casing framed by the margins of the aperture and having therein holes registering with such screw holes, fastening screws having heads on the outer side of such wall and shanks passing through such screw holes into such casing holes to be threadingly engaged therein over an extent greater than the length of such screw holes so as to get a good bite on the casing material threadingly engaged by such shanks, and a faceplate covering such indented portion to conceal from view the heads of such screws while allowing the keys of the keypad to pass through openings in the faceplate so as to be touchable. A telephone stand of such kind is aesthetically acceptable together with providing a mounting of the keypad to the housing which is both rugged and inexpensive.

As an extension of the aspect described above, the keypad may have secured to and beneath it a rigid printed wiring board having on its underside various bulk telephone set components which, hitherto, were often mounted on the base plate of the stand. With such components being mounted underneath the board, they may be cheaply and easily connected in circuit through printed conductors on the upper side of the board and plated through holes therein.

A stand for a telephone set, according to the invention in another of its aspects, comprises: a housing having a handset cradle at its top rear, guide holes extending from the cradle's bottom into the housing's interior, a pair of plungers slidably received in said holes to be movable between up and down positions at which the plungers project above such bottom and down into such interior, a rigid printed wiring board mounted in the housing frontward of the plungers, a line switch mounted on the underside and rear of the board and having an actuating lever with an outer end extending toward the plungers and movable between upper and lower positions corresponding to ON-HOOK and OFF-HOOK conditions for the set, the switch including spring means to impart to the lever a bias urging its outer end to its upper position, and a motion linkage for coupling the lever's outer end to the plungers so that the bias on the lever is transmitted to the plungers to yieldably urge them to their up position assumed when no handset is in the cradle, the plungers being movable from up to down position by the weight of a handset in the cradle so as, through such linkage, to drive the lever's outer end to its lower position to thereby change the line switch from OFF-HOOK to ON-HOOK condition. A telephone stand having the features just described provides the advantage among others that the spring means in the line switch provides not only the spring bias needed for the actuating lever but also the spring bias needed to operate the plungers.

BRIEF DESCRIPTION OF THE DRAWINGS

For a better understanding of the invention, reference is made to the following description of a representative embodiment thereof, and to the accompanying drawings wherein.

DETAILED DESCRIPTION OF EMBODIMENT

Figure 1:
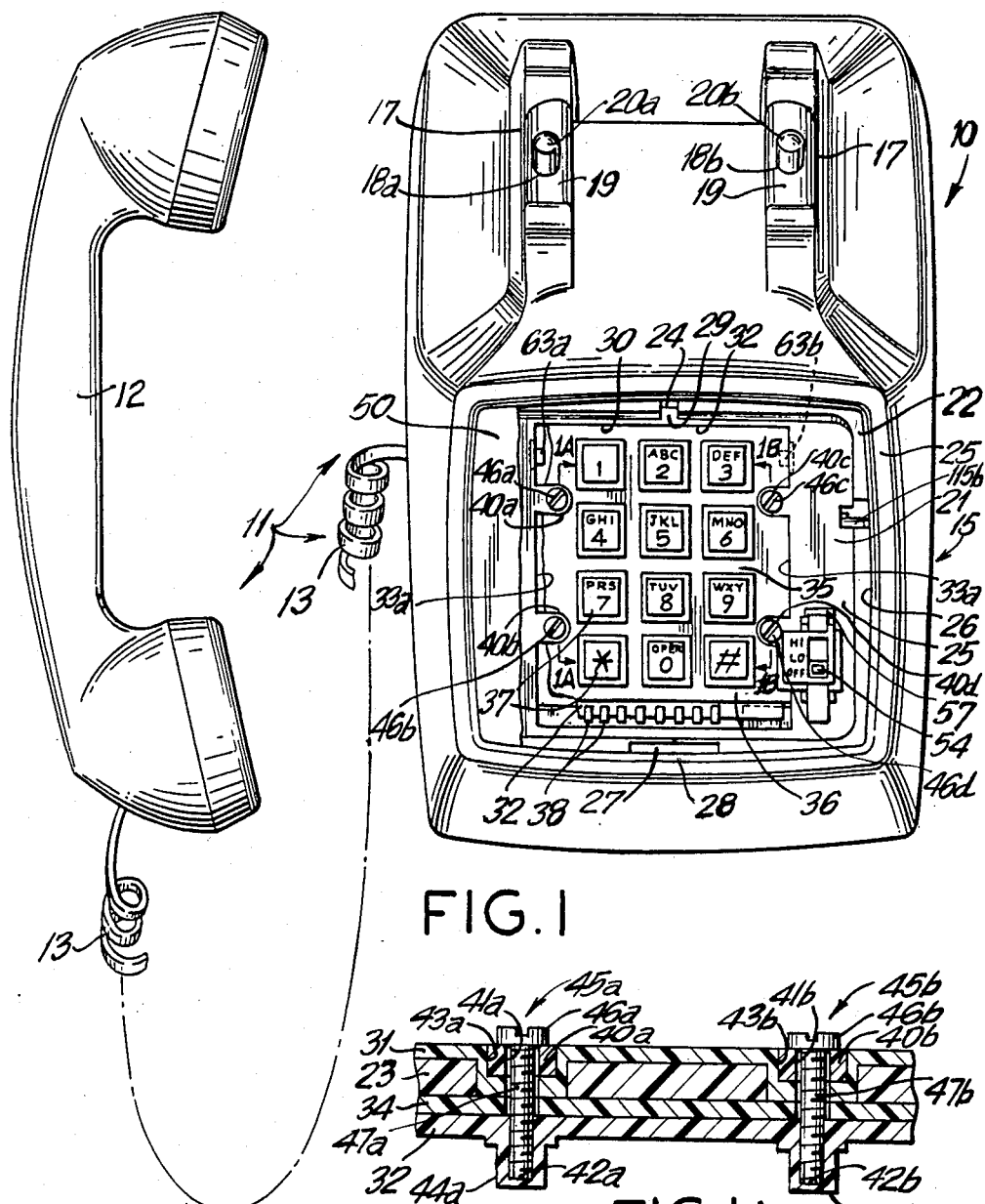
FIG. 1 is a plan view of an exemplary telephone stand according to the invention with certain parts of the stand being shown broken away, and the stand being shown in association with a telephone handset and cord.

Referring now to FIG. 1, the reference numeral 10 designates an exemplary telephone stand according to the invention. Stand 10 is part of a telephone set 11 of which other components are a telephone handset 12 and a cord 13 connecting the handset to the stand. Stand 10 is adapted to be connected to the telephone network by a line cord (not shown) pluggable at one end into a jack 14 (FIG. 3) in the side of stand 10 and, at the other end, into a modular wall jack for coupling the set 11 to such network.

Figure 5:
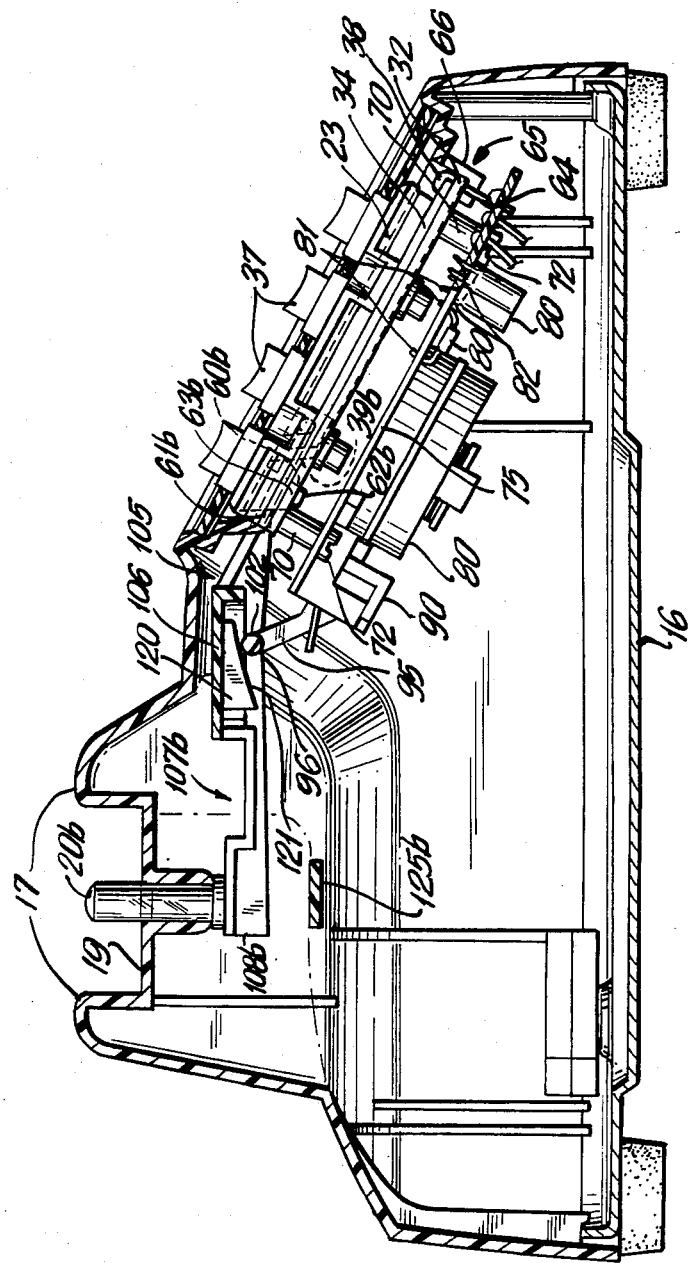
FIG. 5 is a left side elevation in cross-section of the FIG. 1 stand with the plungers thereof being in up position.
Figure 6:
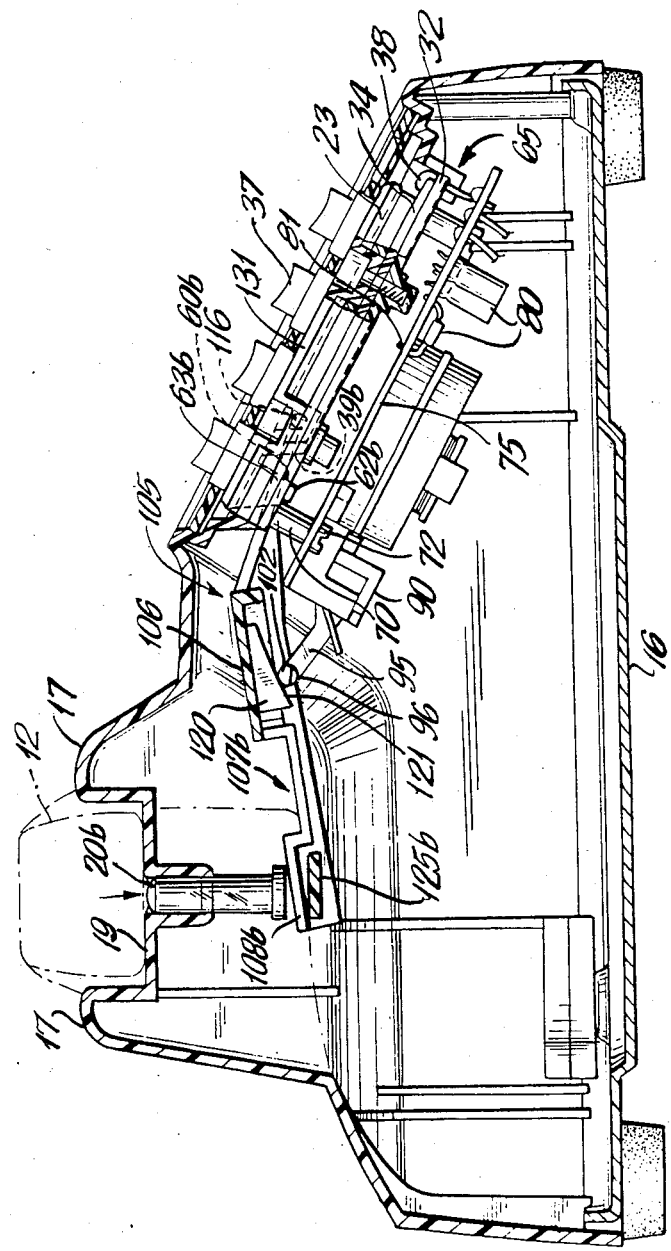
FIG. 6 is a left side elevation in cross-section of the FIG. 1 stand with the plungers thereof being in down position.

The enclosure structure for stand 10 comprises a hollow housing 15 open at the bottom and a base plate 16 (FIGS. 5 and 6) providing a closure for such bottom. Housing 15 is (FIG. 1) a molded plastic (i.e., synthetic resinous) generally thin walled member shaped to provide at the rear of its top a cradle 17 for handset 12. Formed in housing 15 are a pair of through vertical guide holes 18a, 18b extending downward from the bottom 19 of cradle 17 to the interior of housing 15. Slidably received within these guide holes are a pair of plungers 20a, 20b which are movable between up and down positions therefor at which, respectively, the plungers project above the cradle's bottom 19 (FIG. 5) and, conversely, project down into the interior of the housing (FIG. 6).

Disposed frontward of cradle 17, the housing 15 has integral therewith (FIG. 1) a substantially planar upper wall 25 with an upward slant (FIGS. 5 and 6) in the front-to-rear longitudinal direction of the housing. Wall 25 has formed therein a large generally rectangular indented portion 26 having a planar bottom 21 providing a shallow depression in the wall. That depression is peripherally surrounded by a step shoulder 22 of which the top surface is below the upper surface of wall 25 but above that of bottom 21 of the indentation 26. The front part of shoulder 22 has formed therein (for purposes later described) a slot receptacle 27 overhung by a ledge 28. Similarly, the rear part of shoulder 22 has formed therein a notch receptacle 29 overhung by a ledge 24.

Within indented portion 26, wall 25 has formed therein in centered relation with such portion a large generally rectangular aperture 30 only slightly smaller in the longitudinal direction than such portion but moderately smaller than the portion 26 in the lateral direction of the housing. Aperture 30 frames a keypad 35 which may conveniently be a Z72L3 keypad assembly manufactured by AT&T Technologies, Inc., 9595 Mansfield Road, Shreveport, La. 71130. Keypad 35 is disposed inward of the outer surface of wall 25 and has a keypad casing 36 extending across the opening of aperture 30. Casing 36 comprises several parts including an upper cover 31, a spacer plate 23 below the cover, a printed circuit board 34 below plate 23 and having thereon circuitry for the keypad, and a lower support plate 32 (FIGS. 5 and 6). The casing is thicker than the thickness in most parts of wall 25. Other elements of the keypad 35 are an array of twelve keys 37 arranged in 3×4 grid and projecting outward from casing 36 through aperture 30 to each by readily depressible against spring bias by the touch of a human finger. The internal circuitry of keypad 35 is connected by way of an array of flexible insulated conductors 38 to other circuitry in stand 10 as later described. The upper housing wall 25 has integral therewith a pair of duplicate web flanges 39a, 39b of which flange 39a is well shown in FIG. 1D, and which project downward from the bottom 21 of indentation 26 on laterally opposite sides of aperture 30 and extend from the front almost to the rear of that aperture. The lateral side margin 33a of aperture 30 is shaped to provide at the level of planar bottom 21 a pair of support lugs 40a, 40b which are integral with and of the same thickness as the major part of wall 25, and which are located within the indented dished portion 26 thereof. Lugs 40a, 40b are, as shown, spaced from each other along margin 33a and project inwardly towards the center of the aperture. On the other side of the aperture, the lateral margin 33b is shaped to provide similar support lugs 40c and 40d opposite, respectively, the lug 40a and the lug 40b.

Figure 1A:
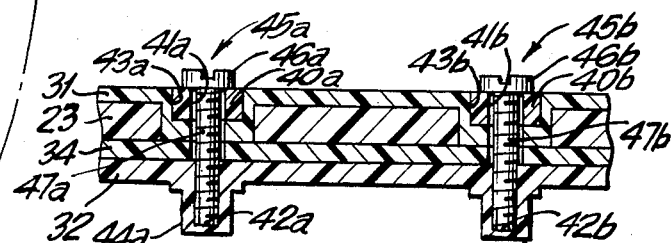
FIGS. 1A and 1B are fragmentary broken-away side elevational views in cross section of certain portions of the FIG. 1 stand, such views being taken as indicated by the arrows 1A,1A and 1B,1B, respectively, in FIG. 1.
Figure 1B:
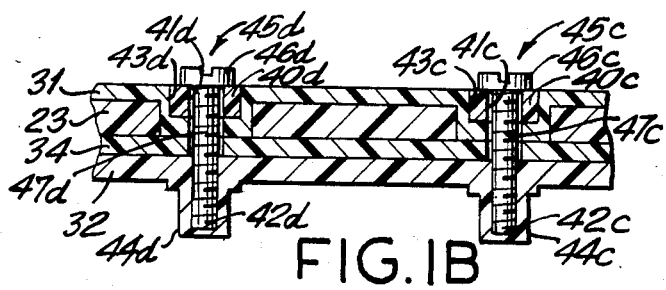

Referring now to FIGS. 1A and 1B, the lugs 40a, 40b, 40c, 40d have formed therein respective smooth bore screw holes 41a, 41b, 41c, 41d passing vertically through the centers of such lugs from the outer to inner surface thereof. Directly beneath those screw holes to register herewith are four holes 43a, 42b, 42c, 42d formed in the keypad casing 36 to extend down thereinto from the upward facing bottom surfaces of four cavities 42a, 43b, 43c, 43d formed in the upper part of keypad casing cover 31 by respective notches projecting into such upper part from the laterally opposite sides of the cover. Notch cavities 43a–43d mate in shape with lugs 40a–40d to receive them so that the top surfaces of the lugs are flush with the top surface of cover 31.

The four casing holes 42a–42d extend down in keypad casing 36 through casing cover 31, printed circuit board 34, lower support plate 32 and into four corresponding stubs 44a, 44b, 44c and 44d projecting down and out from the underside of plate 32. Holes 42a–42d are smooth bore but, within the stubs 44a–44d, are of reduced diameter to permit screws entering the hole portions in those stubs to cut their own threading in the plastic material surrounding those hole portions.

Received within the four passages defined by screw holes 41a–4d and registering casing holes 42a–42d are four fastening screws 45a, 45b, 45c, 45d having respective heads 46a, 46b, 46c, 46d on the outer sides of the lugs 40a–40d and respective shanks 47a, 47b, 47c, 47d passing from such heads down through the screw holes in the lugs and into the casing holes 42a–42d to enter the portions of such holes in stub 44a–44b, and, while within such hole portions, to cut into and threadingly engage with the surrounding plastic material of the stubs. Screws 45a–45d are turned while their shanks 47a–47d are in threaded casing holes 42a–42d to draw keypad casing 36 into firm pressure engagement with lugs 40a–40d so that the under surface of keypad lower support plate 32 is below but substantially flush with the internal housing flanges 39a, 39b, and so that keypad 35 is fixedly secured to lugs 40a–40d and, thus, to housing 15 through its upper wall 25. Note in such connection that the shanks of the fastening screws pass from their heads through wall 25 (i.e., through lugs 40a–40d which are integral parts of such wall) in the outside-to-inside direction of such wall, rather than conversely. Moreover, because the screw shanks threadingly engage within stubs 44a–44d with the plastic material of keypad casing 36 over an extent which is substantially greater than the thickness of wall 25 as represented by the extents through that wall of the screw holes 41a–41d in lugs 40a–40d, screws 45a–45d are enabled, by such threading engagement of their shanks with that plastic material, to get a strong bite on such material as compared to the weak bite which would be attained if the shanks of the screws were to pass in the opposite direction through wall 25 to engage with threads formed in the plastic material surrounding holes formed in such wall. Hence, the described securing of the keypad to the housing by the use of fastening screws of which the threaded shanks pass from their heads on the outside of the housing through holes therein and then into holes in the keypad casing which are threaded over an extent greater than the through dimension of such holes in the housing is a mode of coupling the keypad to the housing adapted to be rugged enough to prevent failure of the telephone stand upon being subjected to impact tests (e.g. "drop" tests) it must pass in order to be commercially acceptable. At the same time, such mode of coupling is simple and cheap as compared to its alternative which is passage of the screws first through the keypad assembly and then into the housing, and which requires molding the housing to have portions thick enough to contain holes with enough length for threading that the screw shanks can get enough "bite" on the housing to provide the needed rugged coupling between it and the keypad assembly.

Another advantage of the described mode of securement of keypad 35 to housing 15 is that the same screws 45a–45d which are utilized to fasten the keypad to the housing are also utilized to permanently fasten together the several mentioned parts 31, 23, 34 and 32 of the keypad casing.

Figure 1C:
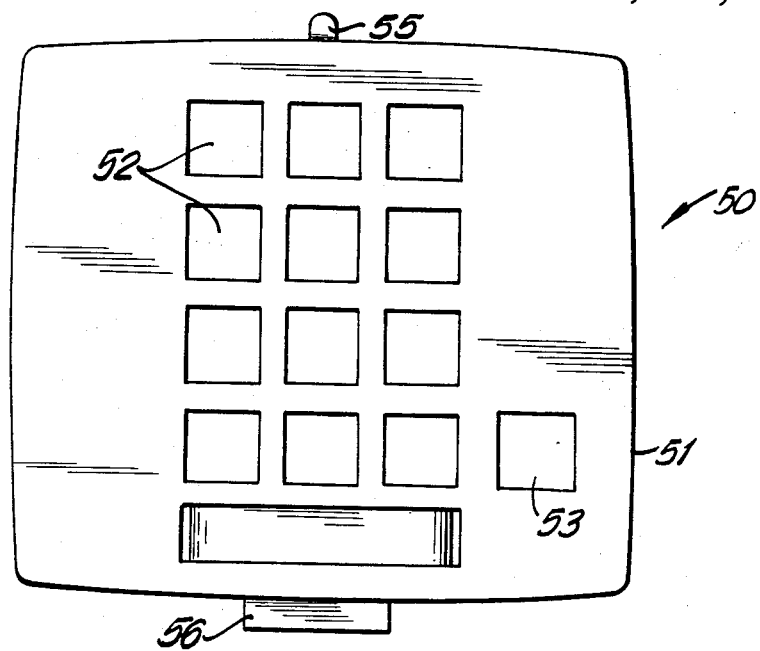
FIG. 1C is a plan view of a faceplate which is one of the components of the FIG. 1 stand.

The indented portion 26 (FIG. 1) of housing wall 25 has received in its depression a faceplate 50 of which the details are shown in FIG. 1C. Referring to that latter figure, faceplate 50 comprises a resiliently warpable synthetic resinous sheet 51 of an outline shape so chosen that the sheet fits snugly within such depression. Sheet 51 has formed therein an array of rectangular openings 52 in an 3×4 grid matching that of the keys 37 of keypad 35. Also formed in sheet 51 is another opening 53 for accommodating a volume switch 54 (FIG. 1) of which the upper part projects upward through, and is snap-fitted into, a small aperture 57 in the dished portion 26 of the housing upper wall 25. Projecting outward from the front and rear margins of sheet 51 are, respectively, a notch tab 55 and a larger slot tab 56.

Faceplate 50 is assembled with the rest of telephone stand 10 after keypad 35 has been secured to housing 15 as earlier described. To so assemble the faceplate it is placed over indented wall portion 26 and upwardly warped by hand to shrink its linear longitudinal dimension to the point where its tab 55 and 56 can be laid on dished portion 26 so as to be directly opposite, respectively, the notch receptacle 29 and the slot receptacle 27. The warping force on the faceplate is then relaxed to permit it to spring back to its normal planar configuration and, as such force is so relaxed, tabs 55 and 56 move outwardly to enter into receptacles 29 and 27, respectively, and be overlain by, respectively, the ledges 24 and 28. Faceplate 50 is thereby retained in place in indented portion 26. When the faceplate is so retained, the keys 37 of the keypad 35 project through their corresponding openings in faceplate 50, and the upper part of switch 54 likewise projects through its faceplate opening 53.

Figure 2:
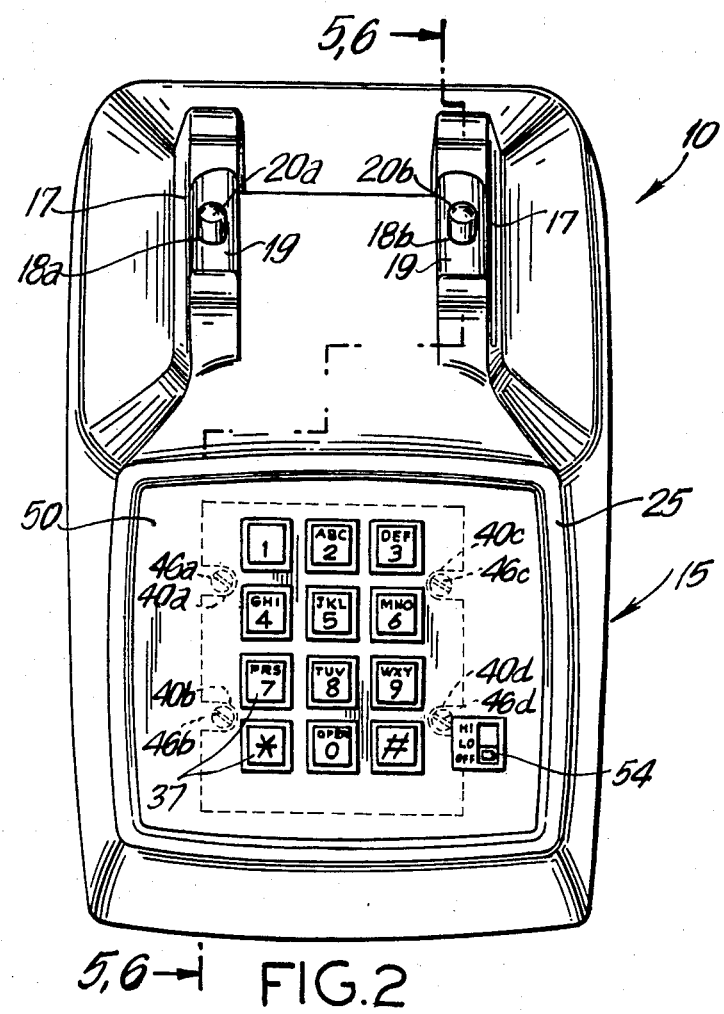
FIG. 2 is a plan view of the FIG. 1 stand with no parts being broken away.

As shown in FIG. 2, when faceplate 50 is assembled to the rest of telephone stand 10, an effect of the faceplate is to conceal from view the screw heads 46a–46d which would otherwise be visible. Thus, the employment of faceplate 50 makes aesthetically acceptable the described mode of securing keypad 35 to housing 15 by fastening screws 45a–45d as well as otherwise finishing off the appearance of telephone stand 10.

Figure 1D:
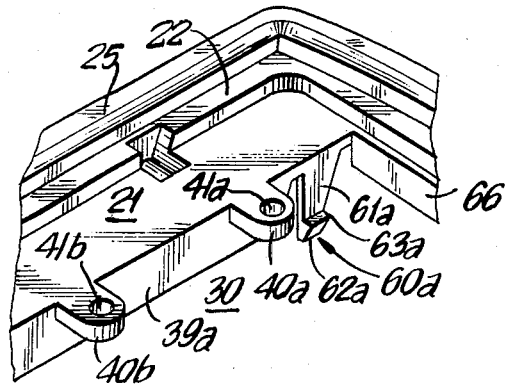
FIG. 1D is an isometric fragmentary view of details which are associated with the upper wall of the FIG. 1 stand, and which include, for example, the large aperture in such wall and one of the latching elements extending downward therefrom.
Figure 1E:
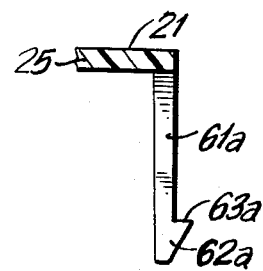
FIG. 1E is a fragmentary view in front elevation of the latching element shown in FIG. 1D.

While screws 45 are the primary means for securing the keypad 35 to the housing 15, the keypad in the course of assembling stand 10 is temporarily held in place in relation to that housing by an arrangement shown in FIGS. 1D, 1E and 5. Referring first to FIGS. 1D and 1E, the housing's upper wall 25 has integral therewith a latching element 60a disposed near the left rear corner of aperture 30 and comprising a resiliently deflectable arm 61a extending downward from wall 25 and, at the lower end of the arm, a hook 62a projecting inwardly from arm 61 and having an upwardly facing catch surface 63a. A similar latching element 60b integral with wall 25 is provided (FIG. 5) near the left rear corner of aperture 30. Elements 60a and 60b are adapted to provisionally retain in place the rear end of support plate 32 which forms part of the casing 36 for the keypad 35. The front end of such plate is likewise adapted to be provisionally retained in place by slipping that end over, and into engagement with the upper sides of the frontwardly projecting webs 64 (FIG. 5) of a pair of "L" shaped bracket parts 65 integral with the bottom 21 of indented wall portion 26 and extending downward therefrom on the laterally opposite sides of, and at the front of, aperture 30, the laterally outward ends of webs 64 being integrally joined with the laterally inward sides of the aforementioned flanges 39a, 39b bordering the aperture 30. The usage of latching elements 60a, 60b and bracket parts 65 for temporarily holding the keypad in place will be later described in further detail.

Lower support plate 32 of keypad casing 36 is a rigid synthetic resinous member having formed on its underside four projecting posts 70 (FIG. 3) integral with the plate and having threaded holes 71 formed in the fronts thereof. A rigid printed wiring board 75 (FIG. 5) is fastened to plate 32 by fastening screws 72 passing through the board 75 and into the holes 71 to be threadingly engaged therein with such posts. Board 75 is thus fixedly secured to keypad 35 and has substantially the same front-to-rear upward slant as does the keypad and the housing's upper wall 25. Since that keypad is, as earlier described, fixedly secured to housing 15, board 75 is likewise fixedly secured to such housing through the securement thereto of the keypad. Apart from such securement of the board to the housing through the keypad, the board has no other fixed securement to the housing. Note in such connection that, with the board being positioned as it within the housing in spaced relation from its interior surfaces, such other securement would be difficult to provide because it would require some special expedient for its implementation as, say, long screws passing through the housing into the board from screw heads outside the housing or, alternatively, long screws passing through the board into the housing with accompanying inability of the screws to be able to get a good bite on the housing. The described mode of fixedly securing the board through the keypad to the housing overcomes, however, the difficulty just mentioned.

Figure 3A:
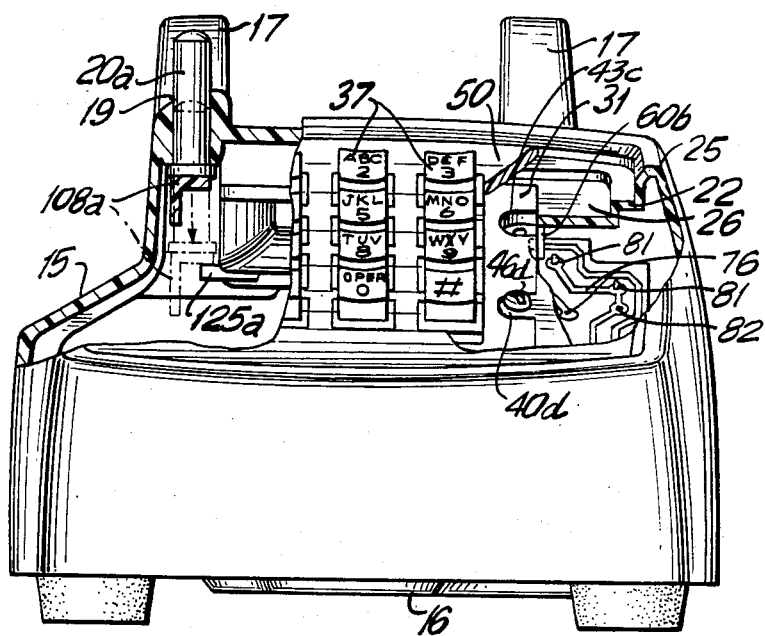
FIG. 3A is a front elevation of the FIG. 1 stand with parts thereof being broken away to expose portions of the interior of such stand.

Board 75 on its upper side has printed electrical conductors 76 (FIG. 3A) connected at the front end of the board to terminal pads (not shown) surrounding plated through holes 77 (FIG. 4) formed in the board and in which the far ends of the flexible conductors 38 from keypad 35 are inserted and then soldered to electrically couple the circuitry of the keypad to those conductors. On its underside, the board 75 carries various of the bulk components 80 for operating telephone set 11, some of such components being for example a tone ringer, a transformer and a hybrid integrated circuit. The components 80 are mounted on board 75 by passing their leads 81 (FIG. 5) up through plated through holes 82 formed in the board to intersect and be electrically continuous with the printed conductors 76 on the upper side thereof, and by then soldering such leads in place in such through holes. In this way, the components are connected through conductors 76 and flexible conductors 38 in circuit with each other and with the circuitry of the keypad without having to resort to the irregularly aligned complex of insulated wire leads which would be required if such components were to be mounted on base plate 16.

When components 80 are mounted on board 75 as described, the sharp free ends of the component leads 81 will project somewhat above the upper surface of board 75 as shown in FIG. 5. However, by using a securement of board 75 to keypad 35 in which the posts 70 space the board away from the keypad support plate 32 while precisely fixing the location of the board in relation to that plate and the keypad 35 of which such plate is a part, such free ends of leads 81 are prevented from digging into the support plate and/or interfering with the ability to precisely locate the board in relation to the keypad (and, thus, in relation to the housing and other components of stand 10 included in such housing).

Another advantage of so spacing board 75 away from keypad 35 is that the relatively large open space provided therebetween provides good circulation of air for cooling the printed wire conductors 76 on the upper side of the board.

Among the components on the underside of board 75 is a line switch 90 disposed at the rear of the board (FIG. 4) and manufactured under ComCode number 43767104 by AT&T Technologies, Inc. at its aforementioned address in Shreveport, La. Switch 90 comprises a casing 91 and a longitudinally extending actuating lever 95 projecting outward from the rear of board 75 towards the rear of housing 15. The inner end 92 of lever 95 is secured to a shaft 93 normal to the lever and rotably mounted within casing 91 so that the lever is pivotable about the lateral axis 94 of shaft 93 to render the outer end 96 of the lever movable between upper and lower positions. Surrounding shaft 93 is spring means in the form of a helical tension spring 97 of which the right hand end is secured to casing 91 and the left hand end is coupled to lever 95 to impart to it a yieldable bias urging the lever's outer end 96 to its upper position. The angular pivoting movement of lever 95 about axis 94 is converted by a crank arm 98 into a translational back and forth movement of a slide 99 disposed in casing 91 and coupled to contactor pairs 100a, 100b, 100c in the casing to render the two electrical contactors in each such pair either "open" or "closed". That coupling is such that when the outer end 96 of lever 95 is in, respectively, its lower position and its upper position, the several contactor pairs 100 are rendered in "open" or "closed" conditions corresponding to, respectively, an ON-HOOK condition for telephone set 11 and an OFF-HOOK condition therefor.

Figure 3:
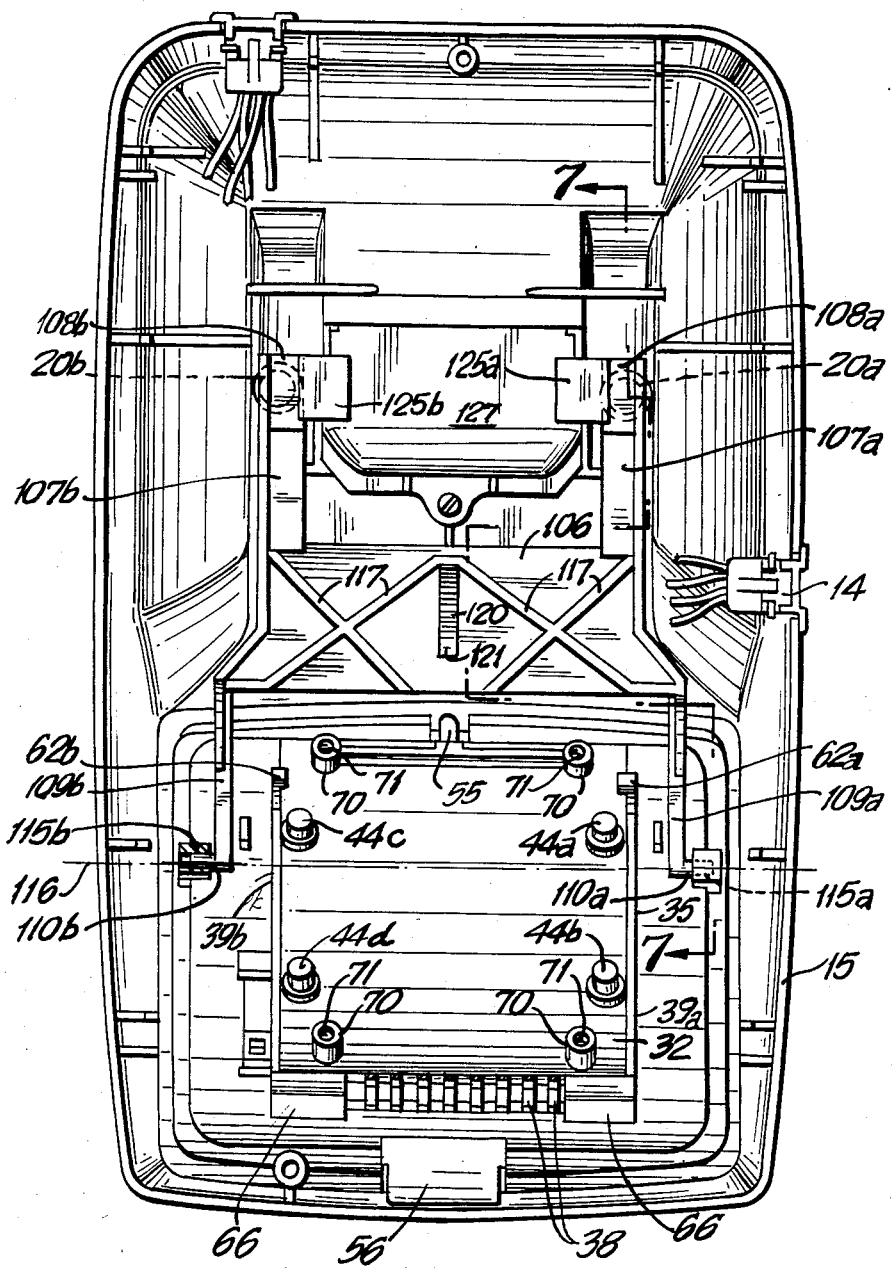
FIG. 3 is a bottom view of the FIG. 1 stand with the printed wiring board normally therein being removed.
Figure 4:
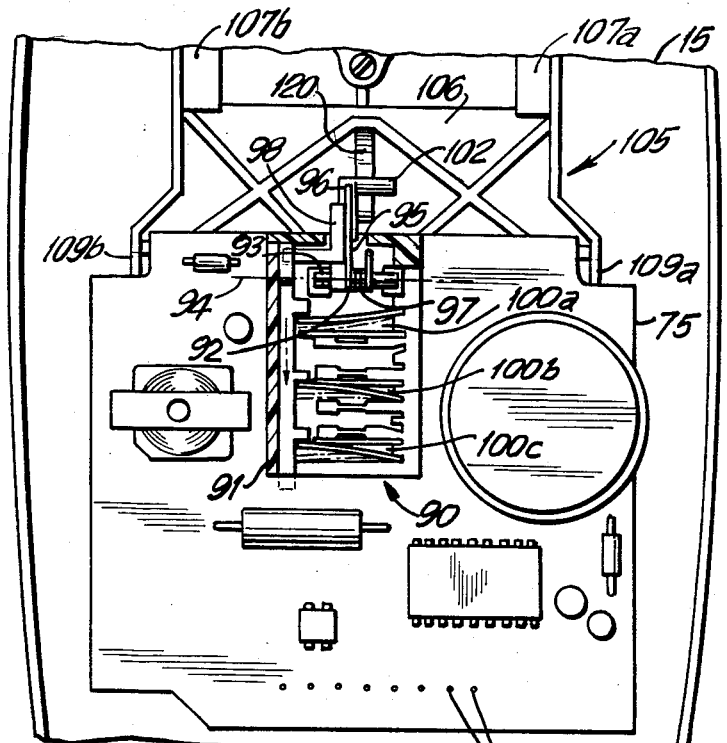
FIG. 4 is a fragmentary bottom view of the FIG. 1 stand with the printed wiring board thereof being in place.

Referring to FIGS. 3 and 4, lever 95 is adapted through a lateral cam arm 102 on its outer end 96 to cooperate with a motion linkage. The linkage is provided by rocker means in the form of an "H" shaped rocker member 105 comprising a laterally extending central web 106 providing the crossarm of the "H" shape, a pair of rocker arms 107a, 107b extending longitudinally rearward from laterally opposite sides of web 106 to terminate in outer end 108a, 108b disposed beneath plungers 20a, 20b, and a pair of rocker legs 109a, 109b extending longitudinally frontward from the laterally opposite sides of web 106 so that legs 109 straddle the support plate 32 of keypad 35 in housing 15. The legs 109a, 109b terminate at their far ends in respective pivot pins 110a, 110b projecting laterally outward from these legs, in opposite directions from each other, to be received in respective bearing sockets 115a, 115b formed in the interior and on laterally opposite sides of housing 15 to be integral parts thereof. Pins 110 and sockets 115 define a lateral axis 116 about which the rocker member 105 is pivotable.

Figure 7:
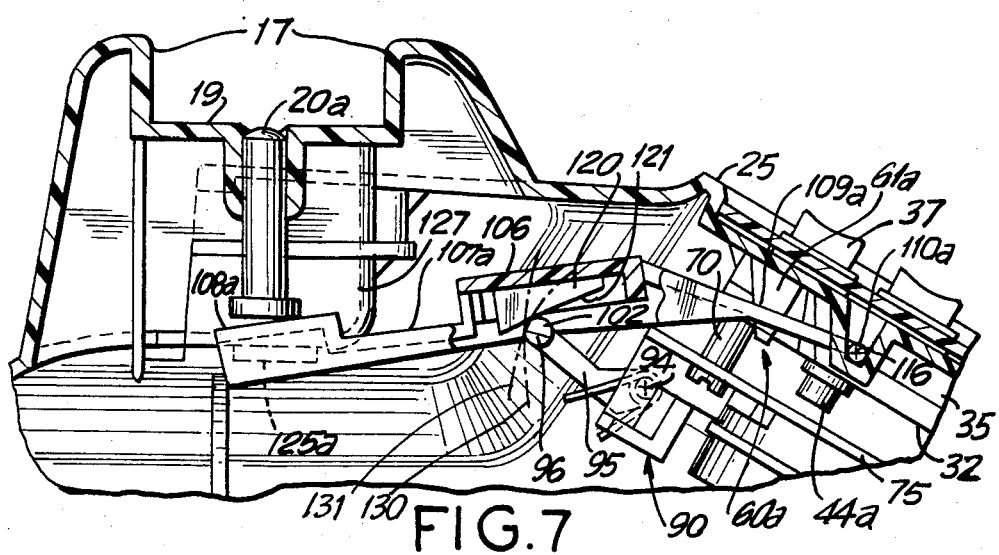
FIG. 7 is an enlarged fragmentary left side elevational view of the FIG. 1 stand, such view providing a showing of details of the rocker plate and switch actuating lever including in the stand.

Referring now to FIGS. 3, 4 and 7, while the rocker arms 107 are, overall, substantially parallel to the plane of rocker web 106 and are close to lying in that plane, the rocker legs 109 extend downwardly away from web 106 at an obtuse angle to the plane thereof so that, when web 106 is level (see FIG. 5), legs 109 have substantially the same slant to the horizontal as do the upper wall 25 of housing 15, the keypad 35 and the printed wiring board 75. To put it another way, the centerlines of arms 107 meet at an obtuse angle with the centerlines of legs 109 so that, considering the whole longitudinal extent of rocker member 105, it has an angular "knee" at a central position within such extent. Such knee is desirable in that it permits the part of rocker member 105 longitudinally coextensive with slanted upper housing wall 25 to be accommodated to the slant of that wall and the similar slants of keypad 35 and printed wiring board 75. While, as stated, the legs 109 which provide that rocker member part are laterally disposed to straddle the keypad 35 (FIG. 3), the printed wiring board 75 which lies beneath these legs is laterally too broad (FIG. 4) for them to straddle. Accordingly, if board 75 were spaced close to keypad 35, that closeness of spacing would prevent the needed amount of pivoting of rocker member 105 inasmuch as the legs 109 of that member would strike the rear of board 75 before the arms 107 of such member had reached their full downward position shown in FIGS. 6 and 7. That problem of premature limiting of the downward movement of arms 107 is, however overcome by the use of the posts 70 which space board 75 far enough down in housing 15 to permit such full downward movement of rocker arms 107 to occur while, concurrently, permitting board 75 to be as wide as can be conveniently accommodated within housing 15 to thereby provide more room for components and circuitry on the board.

As shown in FIG. 3, the rocker member's web 106 has thereon and integral therewith a plurality of raised criss-cross ribs 117 for reinforcing the web. Also formed on web 106 on its underside, as an integral part thereof, is an outwardly projecting central camming rib 120 having on its outer side a curved, longitudinally extending camming surface 121 operably making a slidable bearing contact with cam arm 102 on the outer end 96 of the actuating lever 95 of the line switch 90. The purpose of that slidable bearing contact will be later described.

To prevent the outer ends 108a, 108b of rocker arms 107a, 107b from tilting down too far, those ends are underlain by stop tabs 125a, 125b which are integral with a laterally central downward interior bulge 127 of housing 15, and which tabs 125a, 125b project horizontally out from such bulge to be in the paths of movement of such ends 108.

Assembly and Operation

The telephone stand 10 is assembled in a manner as follows. With keypad 35 being out of housing 15 and the several parts 31, 23, 34, 32 of its casing 36 being temporarily held together by, say, adhering tape applied to the outside of the casing, and with base plate 16 being separated from keypad 35, the printed wiring board 75 and the components 80 and 90 carried thereby are secured to the keypad 35 by fastening screws 72 as earlier described. The combination resulting from such securement is then introduced into housing 15 through its bottom (housing 15 can then conveniently be upside-down), and the board 75 is positioned in the housing so that its front end is seated in retaining brackets 65 (FIG. 5) while, concurrently, the rear end of the board lies below the hooks 62a and 62b of the deflectable latching elements 60a and 60b. (FIGS. 1D and 5). The rear end of the board is then pressed in the inside-to-outside direction of housing 15 to force the resiliently deflectable arms 61a, 61b of elements 60a and 60b laterally outwards to deflected positions so as to permit the rear end of the board to pass by hooks 62a, 62b. After such passage, arms 61a, 61b resiliently spring back to their normal undeflected alignments to position the catch surfaces 63a, 63b on the hooks beneath the underside of board 75. When this occurs, the mentioned combination of elements 35, 75, 80 and 90 is provisionally held in housing 15 by brackets 65 and latch elements 60a, 60b so that, to a working approximation, keypad 35 is positioned beneath support lugs 40a–40d (FIG. 1) with the threaded holes 42a–42d in the keypad casing 36 (FIGS. 1A and 1B) registering with the screw holes 41a–41d in the lugs. During such provisional holding of the keypad in place, rearward movement of the keypad which would unseat its front end from brackets 65 is prevented by a stop flange 66 (FIG. 1D) bordering the rear side of aperture 30, and lateral sidewise movement of the keypad is inhibited by flanges 39a, 39b. Thus, all during such provisional holding, holes 42a–42d are maintained in registration with holes 41a–41d despite handling of the keypad during the assembly operation which might tend to produce misregistration of those holes.

As the next step, base plate 16 is secured by fastening means to housing 15 (FIG. 5) to close the bottom of that housing. The telephone stand as so far assembled may then be turned right-side up. The whole combination 35, 75, 80, 90 is then permanently secured to housing 15 by coupling the combination to the housing by the fastening screws 45 as earlier described. As before mentioned, not only do those screws fasten the keypad to the housing but also they serve to permanently fasten together the elements 31, 23, 34 and 32 of the keypad. Lastly, the face plate 50 is fitted into place as earlier described to cover the heads 46 of those screws and to otherwise finish off the appearance of the stand 10.

Some advantages of the described mode of assembling stand 10 is that, except for the one step of provisionally securing the keypad-printed wiring board combination in place in the housing by elements 60a, 60b, 65, no detailed hand work need be done in the interior of housing 15. Further, since the permanent securing by screws 45 of such combination to the housing can be done with base plate 16 being fitted onto the bottom thereof, it is not necessary after such permanent securing to again turn the housing upside down in order to fit the base plate onto it. Thus the structure of stand 10 which permits such mode of assembling leads to substantial simplification in the assembling of such stand and reduction in the cost of its assembling.

Coming now to the operation of stand 10, attention will be given primarily to the operation of rocker member 105 and the elements associated therewith.

FIG. 5 depicts the condition of the stand when handset 12 (FIG. 1) is removed from the cradle 17 of the stand. In that condition, the described spring bias on the actuating lever 95 of line switch 90 urges the outer end 96 of the lever to its upper position by upward pivoting movement of lever 95 about its pivot axis 94. In the moving of lever end 96 to such upper position, the slidable bearing contact of the cam arm 102 on the lever with the cam surface 121 on rocker member 105 causes pivoting of that member about its pivot axis 116 (FIG. 7) to the position shown in FIG. 5 at which the outer ends 108 of the rocker arms 107 press against the bottoms of plungers 20 to drive them to their up position at which the plungers project above the bottom 19 of cradle 17. To put it another way, the bias imparted to lever 95 from the torsion spring 97 in line switch 90 (FIG. 4) is communicated to the rocker member 105 and, through that member, to plungers 20 to drive them to their up position and to then yieldably maintain them at that position. Concurrently with the plungers being in such up position, the contactor pairs 100a, 100b, 100 of switch 90 are rendered, as earlier described, in "open" or closed conditions corresponding to an OFF-HOOK condition for telephone set 11.

Assume now that, as shown in FIG. 6, the handset 12 is replaced in cradle 17. In those circumstances, the weight of the handset drives plungers 20 down against the yieldable spring bias thereon to depress the outer ends 108 of rocker arms 107 until further downward movement of those ends is stopped by stop tabs 125. Such depression of such rocker arm ends is made possible by downward pivoting of rocker member 105 about its pivot axis 116. That downward movement of the rocker member is communicated through the slidable bearing contact between cam surface 121 on the member and cam arm 102 on switch lever 95 to drive the outer end 96 of that lever from its upper to its lower position against the spring bias on the lever and by downward pivoting movement of the lever about its pivot axis 94. When lever end 96 assumes that lower position, the contactor paris 100a, 100b, 100c in line switch 90 are rendered in "open" or "closed" conditions corresponding to the ON-HOOK condition for telephone set 11. Of course, when handset 12 is again lifted off cradle 17, the events described in connection with FIG. 5 are repeated.

Referring now to FIG. 7, the respective concurrent pivoting movements of rocker member 105 and switch lever 95 which have been described in connection with FIGS. 5 and 6 are made possible only because the slidable bearing contact between cam surface 121 on the member and cam arm 102 on the lever provides a lost motion coupling between the member and the lever. That is, the pivot axis 116 for rocker member 105 is disposed frontwardly of and spaced from the pivot axis 94 for switch lever 95, and the radial distance from the point of contact of elements 121 and 102 ot pivot axis 116 is different than the radial distance from such point of contact to pivot axis 94. With such geometric relations, if the outer end 96 of lever 95 were to be coupled to rocking member 105 in a manner providing for no translational lost motion therebetween, a rigid triangle would be formed, and neither the lever nor the rocking member would be able to move at all. The described slidable bearing contact between lever can arm 102 and the camming surface 127 on the rocking member 105 provides, however, the necessary lost motion so that, at the point of contact between elements 102 and 121, the lever 95 and the rocker member 105 in their respective pivoting movements can follow the separate and different accurate paths of movement 130 and 131 which are shown in FIG. 7 for, respectively, the lever 95 and the rocker member 105. At the same time, the lever and rocker member remain in continuous contact so that there is no break in the transmission therebetween of the mentioned spring bias force and of the force caused by the weight of handset 12 when placed in its cradle 17.

The above described embodiment being exemplary only, it is to be understood that additions thereto, omissions therefrom and modifications thereof can be made without departing from the spirit of the invention and that, accordingly, the invention is not to be considered as limited save as is consonant with the scope of the following claims.

What is claimed is:

1. A stand for a telephone set comprising; a molded, plastic, generally thin-walled open-bottomed hollow housing integral with an upper wall having formed therein (a) a large indented portion providing a shallow depression on the wall's outer side, (b) a large aperture centered within said indented portion and extending through said wall and (c) screw holes disposed within said indented portion adjacent to and on opposite sides of said aperture; a keypad comprising (e) an insulative keypad casing of greater thickness than said wall and disposed in said housing to be framed by said aperture, and (e) an array of keys projecting within said aperture outward from said casing, said casing having formed therein a plurality of holes extending thereinto from its outer side and registering with said screw holes in said wall, a plurality of fastening screws having heads on the outer side of said wall and having shanks extending from said heads through said screw holes and into said casing holes so as to fixedly fasten said keypad to said wall, a faceplate having formed therein an array of openings matching said keys, said faceplate being disposed in said depression so as to conceal from view said heads of said screws and so that said keys pass through said openings in said faceplate, faceplate retaining means to maintain said faceplate in said depression, and a base plate providing a closure for the bottom of said housing.

2. A telephone set stand according to claim 1 in which said aperture has margins on opposite sides thereof and along which are formed fastening lugs which are integral parts of said wall, and which lugs project inwardly towards the center of said aperture, said screw holes being formed in said lugs.

3. A telephone set stand according to claim 1 further comprising, keypad latching means integral with said upper wall and extending downwardly therefrom adjacent said aperture, said latching means being resiliently yieldable to permit passage past such means of said keypad casing when the latter is pressed against such latching means in the direction from the inside to the outside of said wall, and said latching means being adapted upon such passage thereby of said casing to provisionally hold said keypad in position for subsequent fastening thereof to said wall by said screws in a manner permitting that fastening to be effected with the bottom of said housing being closed by said base plate.

4. A telephone set stand according to claim 1 in which said faceplate is resilient, and in which said faceplate retaining means comprises, a plurality of retainer receptacles formed in opposite sides of said indented portion of said wall, and a plurality of retainer tabs integral with said faceplate and projecting outward from opposite sides thereof, said tabs being adapted by resilient warping of such plate and subsequent relaxation of such warping to be snap fitted into said receptacles so as, upon cessation of said warping, to maintain said faceplate in said depression.

5. A telephone set stand according to claim 1 further comprising, a rigid printed wiring board disposed beneath said casing within said housing and above its bottom, said board's underside having mounted thereon a plurality of bulk electrical components for said telephone set, and securing means for fixedly attaching said board to said casing so as, through it, to fixedly attach said board to said wall.

6. A telephone set stand according to claim 5 in which said securing means comprises, a plurality of posts integral with said keypad casing and projecting downwardly and outwardly therefrom, and a corresponding plurality of screws passing through said board into said posts to fasten said board thereto, said posts maintaining said board in spaced relation from the bottom of said casing.

7. A telephone set stand according to claim 5 in which said upper wall of said housing slants upwardly in the longitudinal direction from the front to the rear of said housing, and in which said keypad and printed wiring board have a corresponding upward slat.

8. A telephone set stand according to claim 1 in which said housing has formed at its top and rearward of said upper wall a cradle for a handset, said cradle has formed in its bottom a pair of guide holes extending through said housing to an interior thereof, and in which said stand further comprises: a pair of plungers slidably received in said guide holes to be movable between up and down positions therefor at which, respectively, said plungers project above said bottom and down into said interior, a line switch having pairs of contacts and a contact actuating lever pivotable about a lateral axis to be movable at an outer end between lower and upper positions at which said pairs of contacts are caused by said lever to be in ON-HOOK and OFF-HOOK conditions for said telephone set, said switch including spring means for yieldably biasing said lever to urge said outer end to its upper position, and a motion linkage for coupling the outer end of said lever with said plungers so that the spring bias exerted on said lever is transmitted through said linkage to said plungers to yieldably maintain them in their up position with no handset being in said cradle, said linkage being adapted to shift said lever to its lower position against said bias under the weight of a handset when the latter is placed in said cradle to drive said plungers by such weight to their down position.

9. A telephone set stand according to claim 8 in which said motion linkage comprises: rocker means extending longitudinally in said housing and disposed, at its rear, beneath said plungers and, at a longitudinally central part thereof, above said contact actuating lever's outer end, said rocker means being hinged at its front to be pivotable about a lateral axis frontward of the pivot axis of said lever so that said rocker means at its rear is movable up and down beneath said plungers while bearing against them, and said lever being adapted by a coupling of the outer end thereof with said central part of said rocker means to transmit said spring bias through said rocker means to said plungers.

10. A telephone set stand according to claim 9 further comprising stop means disposed in said housing to limit the downward movement of said rocker means at its rear.

11. A telephone set stand according to claim 9 in which said rocker means comprises an "H" shaped member having a central laterally extending web providing the cross-arm of its "H" shape and disposed above said lever's outer end, a pair of arms extending rearwardly from laterally opposite sides of said web to terminate in respective outer ends each disposed beneath a respective one of said two plungers, and a pair of legs extending frontwardly from the opposite lateral sides of said web to pivotal couplings of said legs with said housing.

12. A telephone set stand according to claim 9 in which such coupling of said outer end of said lever with said central part of said rocker means is effected by said outer end of said lever bearing upwardly against the underside of said central part so as to be longitudinally slidable relative thereto to provide slidable bearing contact between said outer end of said level and said central part as said lever and rocker means pivot about their respective pivot axes.

13. A telephone set stand according to claim 12 in which such longitudinally central part of said rocker means has integral therewith a laterally central, downwardly projecting rib with a cam surface on the underside thereof, and in which said outer end of said lever has thereon a cam follower element adapted by contacting said cam surface to provide such slidable bearing coupling between such outer end of said lever and said central part of said rocker means.

14. A telephone set stand according to claim 1 in which said shanks of said fastening screws threadingly engage in said holes in said casing with material surrounding said holes over an extent in said holes which is greater than the length of said screw holes formed in said upper wall of said housing.

15. A telephone set stand according to claim 1 in which said keyboard casing comprises: an upper cover, a printed circuit board beneath said cover, and a lower support plate disposed beneath said printed circuit board and having formed on the underside thereof a plurality of stubs integral therewith and projecting downward from the bottom of such plate; and in which said holes in said casing extend through such cover, board and plate and into said stubs, and said shanks of said fastening screws extend in such holes down into said stubs and threadingly engage within said stubs with surrounding material.

16. A stand for a telephone set comprising, a molded plastic open-bottomed hollow housing having on its top side an upper wall having a large aperture formed therein, said housing having at its top to the rear of such wall a cradle for said handset, and said housing having formed therein a pair of through guide holes extending from said cradle's bottom through said housing to an interior of said housing, a pair of plungers slidably received in said holes to be movable between up and down positions at which said plungers project, respectively, above said cradle's bottom and down into said interior, a keypad secured in said housing in registration with said aperture, a printed wiring board secured in and to said housing beneath said keypad and frontward of said plungers, a line switch mounted at the rear of said board on its underside and having an actuating lever extending towards said plungers to an outer end of said lever, said lever being pivotable about a lateral axis to be movable at its outer end between upper and lower positions, and said switch including spring means imparting to said lever a yieldable bias urging said lever's outer end to its upper position, and rocker means extending longitudinally in said housing to be disposed, at its rear, beneath said plungers while bearing against them and, in a central part thereof, above said lever's outer end, said rocker means being hingedly mounted to be pivotable about a lateral axis longitudinally spaced in the frontward direction from the pivot axis of said lever, said lever's outer end being in longitudinally slidable bearing contact with the underside of said central part of said rocker means to provide a coupling between said lever and rocker means as they pivot about their respective pivot axes, and said lever being adapted to transmit the spring bias thereon through its coupling with said rocker means to said plungers to urge them to their up positions with no handset being in said cradle, said plungers being responsive to the weight of a handset in said cradle to move to their down positions at which said rocker means at its rear is tilted downward by said plungers to displace said lever's outer end downward to its lower position against the urging of said bias.

17. A telephone set stand according to claim 16 in which said rocker means comprises an "H" shaped rocker member comprising a laterally-extending longitudinally central web making said longitudinally slidable bearing contact with said lever's outer end, a pair of arms extending rearwardly from laterally opposite sides of said web to terminate in respective outer ends each disposed beneath, and in bearing contact with, a respective one of said plungers, and a pair of legs extending frontwardly from the laterally opposite sides of said web so that said legs straddle said keypad.

18. A telephone set stand according to claim 17 in which said upper wall, keypad and printed wiring board all slant upwardly at substantially the same angle in the front-to-rear longitudinal direction of said housing, and in which said legs of said rocker means are, in such direction, at an obtuse angle to the arms thereof so as to impart to such legs an upward slant when such arms are horizontal.

19. A stand for a telephone set comprising, a housing, a handset cradle at the top and rear of said housing, said housing having formed in it a pair of guide holes extending from said cradle's bottom through said housing to its interior, a pair of plungers slidably received in said holes to be movable between up and down positions at which said plungers project, respectively, above said bottom and down into said interior, a printed wiring board mounted in said housing frontward of said plungers so as to be longitudinally spaced therefrom, a line switch mounted at the rear of said board on its underside, and having an actuating lever extending towards said plungers to an outer end for said lever, said lever being pivotable about a first lateral axis to be movable at its outer end between upper and lower positions, and said switch including spring means imparting to said lever a yieldable bias urging said lever's outer end to its upper position, and rocker means extending longitudinally in said housing to be disposed, at its rear, beneath said plungers while bearing against them and, in a central part thereof, above the outer end of said lever, said rocker means being hingedly mounted at its front to be pivotable about a second lateral axis longitudinally spaced in the frontward direction from the pivot axis of said lever, said lever's outer end being in longitudinally slidable bearing contact with the underside of said central part of said rocker means to provide a coupling between said lever and rocker means as they pivot about their respective pivot axes, and said lever being adapted to transmit the spring bias thereon through said coupling and said rocker means to said plungers to urge them to their up positions with no handset being in said cradle, said plungers being responsive to the weight of a handset in said cradle to move to their down positions at which said rocker means at its rear is tilted downward by said plungers to displace said lever's outer end downward to its lower position against the urging of said bias.

20. A telephone stand comprising, a housing having formed at its top and longitudinally at its rear a cradle for a handset, a pair of plungers slidably received in said housing to be movable between up and down positions at which said plungers project, respectively, above said cradle's bottom and into an interior of said housing, a switch mounted in said housing longitudinally frontward of said plungers and including pairs of contactors, said switch having a lever extending longitudinally towards said plungers to an outer end of such lever adapted by pivoting movements of said lever about a lateral pivot axis to be moved between upper and lower positions of such end at which said pairs of contactors in said switch are actuated by said lever to be in open and closed conditions corresponding to OFF-HOOK and ON-HOOK conditions for said handset, and said switch including a spring for imparting to said lever a bias urging its outer end to said upper position, and linkage means coupled in said housing between said lever's outer end and said plungers so as, with no handset in said cradle and said outer end being in upper position, to maintain said plungers in their up position while concurrently providing for the weight of a handset on said plungers to drive said plungers to their down position and said outer end to its lower position.

21. A telephone stand according to claim 20 in which said linkage means comprises, a rocker member bearing at its rear against the bottoms of said plungers and hingedly mounted at its front to be adapted to undergo pivoting movements about a lateral axis frontward of said pivot axis of said lever, said rocker member being coupled to the outer end of said lever by a longitudinally slidable bearing contact therebetween.

* * * * *